3,360,444
SOLVENT RECOVERY BY PLURAL DISTILLATION WITH UTILIZATION OF SOLID ABSORBENT
Irving Leibson, Odessa, and Ray Richard Rasmussen, Houston, Tex., assignors to Rexall Drug and Chemical Company, Los Angeles, Calif., a corporation of Delaware
Filed May 18, 1965, Ser. No. 456,695
5 Claims. (Cl. 203—41)

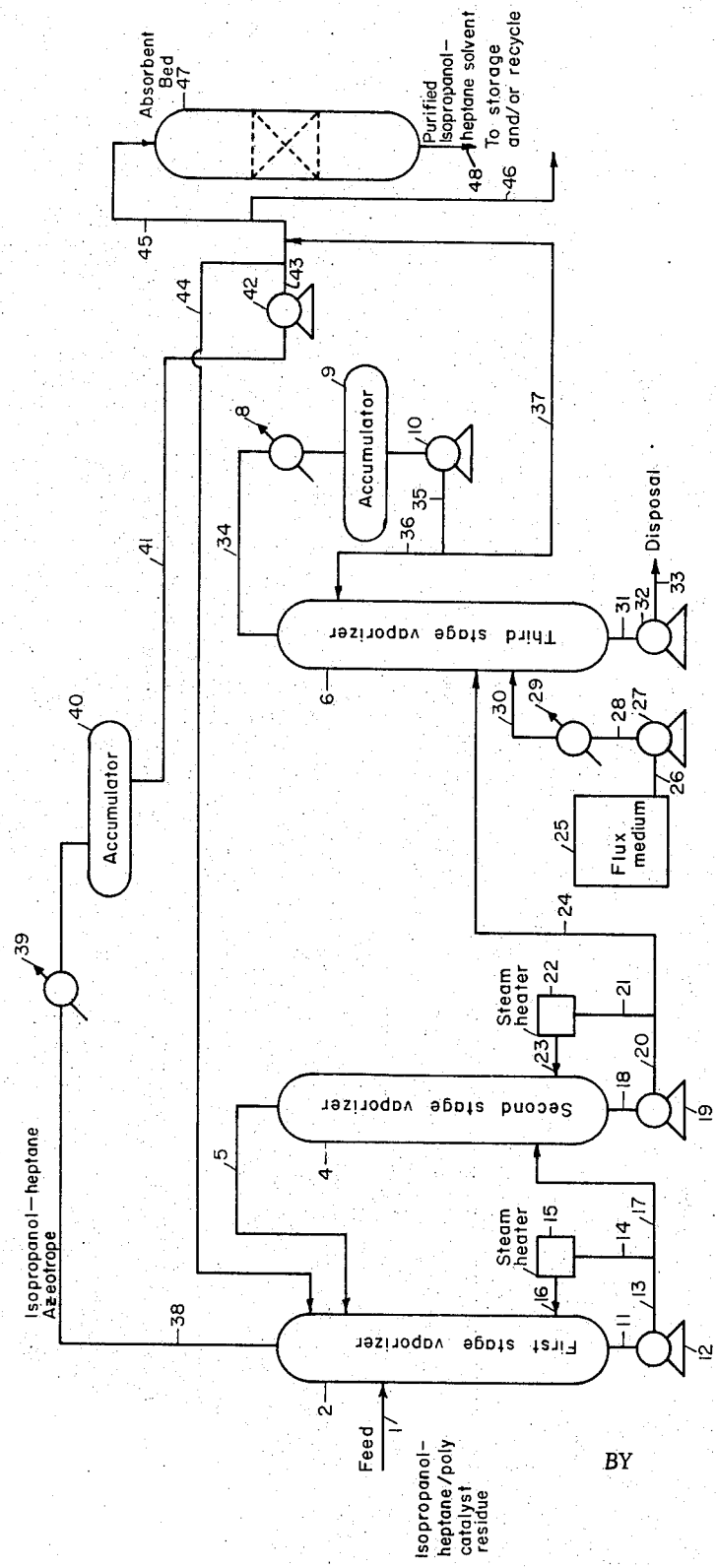

ABSTRACT OF THE DISCLOSURE

Three-stage system for recevoring deashing solvent from a mixture of the solvent containing catalyst and polymeric residues is improved by recycling a portion of tion recovered solvent, passing another portion through an adsorbent bed and recovering a substantially pure solvent from the bed.

---

This invention relates to a novel method for recovering a purified solvent or solvents from solvent compositions contaminated with extraction residues derived from an alpha-olefin polymer deashing operation. More particularly, the invention pertains to a novel step-wise method for recovering substantially completely in purified form solvent components from a contaminated alpha-olefin polymer deashing liquid.

In various processes for the synthesis of polymeric products from alpha-olefin such as ethylene, propylene, and higher olefinic compounds or admixtures thereof, the resulting polymers contain low molecular weight polymeric residues as well as catalyst residues, which residues are usually extracted by a so-called "deashing" operation, whether in one or a series of steps. Liquid solvents are employed for these extraction processes and such solvents become contaminated with the extracted residues. Large amounts of such solvents are cycled in operations of this type, usually amounting to thousands of gallons per day in continuous manufacture of alpha-olefin polymers and it is of utmost importance for economic operation not only to recover substantially completely all solvents for reuse in the operation, but to recover said solvents in a purified form so that large investment is not required for extensive purification facilities.

In accordance with the foregoing, this invention has as an object a method for a substantial recovery of purified solvents from contaminated streams thereof derived from alpha-olefin polymer deashing operations.

A further object of this invention is to provide an efficient step-wise process for a substantial recovery of purified solvents from contaminated streams thereof derived from the herein indicated deashing operations.

Further objects of this invention will be readily apparent from the specification of this invention.

This invention provides a step-wise process for recovering a substantial amount of a purified solvent from a contaminated solvent derived from an alpha-olefin deashing operation, said contaminants being polymeric and catalyst residues as well as other minor components which are extracted by said solvent, said process comprising introducing said contaminated solvent to a first stage vaporization zone and recovering overhead a major proportion of purified solvent, introducing the resulting first stage vaporization residue to a second stage vaporization zone and recovering overhead a major proportion of purified solvent from said first stage vaporization residue, introducing the resulting second stage vaporization residue to a third stage vaporization zone in conjunction preferably with a heated flux medium, said medium being heated to a temperature above the boiling point of the solvent, said medium having an initial boiling point above the boiling point of said solvent, and recovering overhead the remainder of said solvent from said second stage vaporization zone.

In a preferred embodiment of this invention the polyolefin is prepared by polymerization an olefin such as propylene employing as a catalyst system a transition metal compound and an organometallic reducing agent, such as a transition metal halide activated with an aluminum alkyl compound. The prior art discloses sufficiently the nature of these organometallic catalysts so henceforth reference will be made only to titanium trichloride and an aluminum alkyl cocatalyst (which aluminum alkyl includes aluminum trialkyls or dialkyl aluminum halides). Further, although the invention is applicable to alpha-olefin polymers from alpha-olefins of from 2 to 10 or more carbon atoms and random or block copolymers thereof, reference will be made to propylene as the preferred alpha-olefin monomer and polypropylene as the preferred polymer. Still further, the term "solvent" as employed in this specification is intended to mean either an oxygenated compound, such as an alcohol (a primary or secondary alcohol of from 1 to 8 carbon atoms for example of the paraffin series) or a polyhydroxy compound (such as ethylene glycol or a ketone, etc.), alone or in combination with a diluent such as that employed during the polymerization reaction, that is, a normally liquid aromatic or paraffinic hydrocarbon (examples of these are pentane, hexane, heptane, octane, benzene, toluene, xylene or petroleum fractions). The hydrocarbon can be the one used initially in the polymerization reaction or can be admixed with the alcohol in the subsequent catalyst extraction steps. The "deashing" operation herein alluded to usually involves treatment of a row polymer product containing live catalyst residues with an alcohol either in the present or absence of a hydrocarbon at certain preferred temperatures and treatment times which results in deactivation and extraction of the catalyst residues from the polymer. Whether this step is performed separately (the alcohol treatment) or in conjunction with a hydrocarbon, eventually the extractants become contaminated with catalyst residues and wheer the hydrocarbon is used either separately or in conjunction with the alcohol, there results an up-grading of the polymer by the extraction of low molecular weight waxy or atactic residues. It is to the purification and recovery of these extractants, or as will be referred to hereinafter, solvents, whether alone or in admixture, that the process of this invention is particularly adapted to. For the sake of simplicity, the solvents will be hereinafter further considered as a combination of an alcohol and a hydrocarbon, preferably an azeotrope which is used to solubilize and extract catalyst residues as well as to extract the low molecular weight polymeric materials from the raw polymer composition. Various azeotropes will hereinafter be commented upon (or compositions approaching azeotropic combinations).

In a preferred operation involving a propylene polymer manufacture, after the polymerization there is recovered from a reaction zone wherein the reaction was carried out in the presence of a titanium trichloride and diethylaluminum monochloride, a slurry of polymer usually in a hydrocarbon diluent or in the presence of the monomer, in the case of bulk polymerizations, and this slurry is treated to deactivate the catalyst (this is a particle form polymerization process which is to be distinguished from a solution polymerization process where the polymer formed remains in solution). In the preferred method, the polymer is prepared in a bulk process and the slurry which consists of solid polymer particles dispersed in the unpolymerized monomer is taken to a deashing vessel wherein an azeotrope of isopropanol and heptane is employed to deash and up-grade the polymer. The filtrate from this deashing step (such deashing can be carried out in one or more stages) is the starting feed material for the process of this invention. As noted, thousands of gallons of such solvents are normally cycled daily in commercial plants and they must be recovered and purified to make an operation of this nature economical.

The method of this invention employs a step-wise technique for recovering a purified solvent from a contaminated filtrate from a deashing operation which can contain from less than 0.5 to about 15% by weight of contaminants in the form of atactic polymer, catalyst residues and other minor components. According to the preferred process herein the feed stream ordinarily contains from about 1 to 5 percent by weight of impurities. The accompanying drawing, which is incorporated herein by reference, illustrates the step-wise process of the preferred method of obtaining a substantially purified feed along with a substantial recovery of the desired solvent. In the drawing, the contaminated feed enters a first stage vaporizer 2 through line 1. The first stage vaporizer is ordinarily maintained at a pressure of from 1–25 p.s.i.a. and a temperature of about 170° to 195° F. In this vaporizer, a major proportion of the solvent (isopropanol and heptane) that is, above 50 percent present in the vaporizer and up to about 98 percent, is recovered overhead via line 38. The residue is taken via line 11, pump 12, line 13 and part of it is recirculated through line 14 through reboiler 15 and line 16 to vaporizer 2. The remainder of the residue is taken via line 17 to the second stage vaporizer 4. In the second stage vaporizer, which is also maintained at a pressure of from about 1–25 p.s.i.a. and a temperature of from 170° to 210° F., there is further recovered a major proportion of solvent (isopropanol and heptane), that is, above 50 percent present in the vaporizer and up to 95 percent, overhead via line 5. Line 5 can be recycled back to the upper section of the first stage vaporizer for further stripping or joined directly to line 38. The original contaminated feed stream which contained less than about 5% contaminants is thus concentrated so that as it leaves the first stage vaporizer the contaminants comprise up to 15% or more of the mixture, while the residue from the second stage vaporizer is further concentrated so that the contaminating impurities comprise from 10 to 60% or even up to 70% of the mixture leaving the second stage vaporizer. This second stage residue is taken via line 18 and through pump 19 to line 20. A portion of this residue can be recirculated through line 21, through reboiler 22 and line 23 to the second stage vaporizer 4. The remainder of the residue is led via line 24 to the third stage vaporizer 6. A flux medium (to be more fully defined hereinafter) is taken from unit 25, line 26 and pump 27 through line 28, heat exchanger 29, and line 30 to the vaporizer. Line 30 can also be joined if desired to line 24. The third stage vaporizer is preferably maintained at a pressure of from 1 to 15 p.s.i.a. (lower and higher pressures can be used, for example from 10 mm. Hg abs. to super-atmospheric pressures) and a temperature of above 170° F., such as 180° to 220° F. or higher. The flux medium is preferably introduced to this third stage vaporizer at a temperature of 300° to 600° F. (preheated). The latent heat of this medium, therefore, permits the proper heat exchange with the second stage residue and enables the volatiles in the mixture (isopropanol and heptane) in the vaporizer to be flashed or vaporized in major amounts (above 50%), that is, from 95 to substantially 100 percent. The residue from the third stage vaporizer is recovered through line 31 and pump 32 and to line 33 for further disposal. The residue at this point is merely a combination of the flux medium (usually a cheap disposable, high boiling hydrocarbon) containing the atactic polymer, and possibly some isotactic polymer, catalyst residues and other minor components extracted by the deashing solvents. The overhead from the third stage vaporizer 6, that is, the isopropanol and heptane is taken via line 34 through heat exchanger 8 and accumulator 9. From the accumulator the solvent can be withdrawn and taken via pump 10 to line 35, a portion being recycled to the third stage vaporizer via line 36 and the remainder being taken via line 37 to join line 43 or 45.

The isopropanol-heptane solvent taken via line 38 from the first stage vaporizer 2 is taken through heat exchanger 39, accumulator 40 and line 41 to pump 42. The effluent from pump 42 is taken to line 43 and a portion is recycled through line 44 back to the first stage vaporizer to aid in the further purification of the components. The isopropanol-heptane mixture in line 43 is substantially a very pure mixture. As indicated in the drawing, a portion of this can be taken through line 46 to storage and/or a recycle operation for further deashing steps in the process, while the other portion of the effluent from line 43 can be taken via line 45 to a unit such as 47, which in the drawing represents an adsorbent bed such as molecular sieves to purify even further this solvent stream. The effluent from the adsorbent bed 47 can be taken via line 48 to storage as in the case of the effluent from line 46 or to further recycle operations.

The flux medium hereinabove referred to is essentially a medium having a high initial boiling point and a high affinity for the contaminants present in the second stage vaporizer residue. The initial boiling point of this medium should preferably be higher than the highest temperature employed to vaporize the volatiles present in the third stage vaporizer in order to avoid contamination of the overhead effluent from this unit. The medium should also be a readily pumpable mixture, that is, its viscosity after having dissolved or contained therein from 10 to 70% of the contaminating impurities should not be so high as to preclude its being handled by a pumping operation as indicated. Various materials can be employed for use as flux media (the term "flux" as used herein, is understood to mean a fluid at the temperatures existing in the vaporizer and used to contain the substantially non-volatile impurities). One such material can be a heavy aromatic hydrocarbon fraction from a refinery operation such as one having an initial boiling point within the range of about 300° to 800° F., preferably 400° to 700° F., an API gravity of about 1° to 4° and a cps. viscosity of from 100 up to 5,000. Such oils are cheap and, if desired, can be burned or disposed of in any manner once they have extracted the contaminants from the second stage vaporizer residues. Another oil which can be employed is a polyalkyl benzene type material, such as polyethylbenzene. A particularly useful polyethylbenzene is one having a viscosity of about 5–1000 cps., preferably 10–100 cps. and an initial boiling point above about 300° F., preferably above 375° F. This type of oil has a high affinity for atactic polymer residues and forms one of the preferred flux media herein. A still further flux material which can be used as a paraffinic wax which likewise has a high initial boiling point, that is, above about 300° F., or any other suitable composition which functions in the manner herein explained and for the purpose intended. Copending applications Ser. No. 291,008, filed June 27, 1963 now U.S. Patent Number 3,311,545 and Ser. No. 448,390, filed Apr. 15, 1965 illustrate respectively a heavy aromatic hydrocarbon and polyalkyl benzenes of flux oils.

All of the equipment illustrated in the drawing is standard and commercially available. Thus, the first stage vaporizer can contain valve trays (such as might be desired in the event of recycle of certain isopropanol-heptane feed streams from downstream process units), while the second stage vaporizer need not be provided with such trays. Likewise the third stage vaporizer can contain a series of trays to aid in efficient separation of the volatile components. While certain preferred temperatures and pressures have herein been indicated for suitable operation of the process herein as applied to the vaporizers, it is to be noted that the function of these units is to recover overhead a substantially purified stream of solvent whether in azeotropic form or not and certain variations in temperature and pressure can be made. For example, pressures and temperatures above or below those noted can be used or even partial vacuum conditions and lower temperatures can be employed so long as the desired separation or volatilization of the solvents in a purified form is realized. The function of the reboiler units as well as the accumulators is understood in the art and henceforth require no further comment.

To illustrate the efficiency of recovery of solvent according to the process of this invention, the following example is offered.

*Example*

A feed stream consisting essentially of about 98.5 to 99.0% isopropanol-heptane in a substantially azeotropic combination is introduced through line 1 to first stage vaporizer 2. The remainder of the feed stream consists of from 1 to 1.5% of impurities such as atactic and catalyst residues and extremely small amounts of other contaminents. From line 38 there is withdrawn overhead from 92 to 93% of the total isopropanol-heptane in the system, that is, the vaporizer, leaving a residue of 7 to 8% as bottoms. The bottoms material is conveyed via line 11, pump 12 to line 13 (a portion being recycled as indicated) and line 17 to the second stage vaporizer. The bottoms material in line 17 from the first stage vaporizer consist of about 90% of an isopropanol-heptane combination as above and about 10% impurities. From vaporizer 4, 80% of the total isopropanol-heptane mixture is withdrawn overhead via line 5, leaving 20% as a residue, said residue consisting of isopropanol-heptane and contaminants. The residue which is conveyed in line 24 to the third stage vaporizer 6 now consists essentially of about 65 to 66% isopropanol-heptane, with the remainder 34 to 35% being the impurities. A total of from 98 to 99% of the isopropanol-heptane in the residue is recovered overhead off vaporizer 6 via line 34, leaving the remainder 1 to 2% as bottoms. In this example, a flux medium (a polyethylbenzene oil) from unit 25 was introduced into vaporized 6 via line 30 in an amount of approximately from 150 to 200% of the weight of the impurities introduced into vaporizer 6. The flux oil was introduced at a temperature between about 400° to 600° F. In this example, after calculating the total amount of isopropanol-heptane in the feed stream and that recovered overhead from the three stage process therein, it was found that the total amount, percentage-wise, of isopropanol-heptane remaining in line 33 which was taken to disposal was less than 0.03%. Thus, not only was a substantial 100% recovery of the isopropanol-heptane obtained, but also the purity of the recovered products was high. For example, the stream in line 43 contained less than 50 p.p.m. of water and this amount can be even further reduced as illustrated by passing at least a portion of the recovered isopropanol-heptane through an adsorbent bed such as through unit 47. The remainder of the solvent consisted essentially of highly purified isopropanol and heptane suitable for immediate reuse in upstream processing operations (e.g. deashing). The recovered product can be taken to storage or recycled as illustrated in the drawing, line 46. This example thus illustrates the operability and efficiency of the step-wise process of this invention and specifically as adapted to the recovery of an isopropanol-heptane composition which is substantially an azeotropic system.

While it has been stated herein that it is preferred to operate a deashing system employing an isopropanol-heptane combination, other alcohol-hydrocarbon azeotropes are also encompassed within this preferred embodiment. Thus, azeotropic compositions of alcohols and normally liquid hydrocarbons boiling at a temperature range from about 150° to 300° F. are suitable. Such azeotropic combinations can consist, for example, of isooctane and any one of the following: ethanol, propanol, isobutanol or isopropanol. Toluene and any of the cited alcohols above can also be employed and even xylene with any of the same alcohols. Thus, an azeotropic combination of isooctane (47%) and ethanol (53%) has an azeotrope boiling point of about 162° F.; heptane (49.5%) and isopropanol (50.5%) has an azeotrope boiling point of about 170° F. and m-xylene (14%) and isobutanol (86%) has an azeotropic boiling point of about 227° F. The minimum temperature, therefore, that should be employed in any of the vaporizers should be that corresponding to the azeotropic boiling point of the particular alcohol-hydrocarbon composition. It should also be understood that the flux medium should have an initial higher boiling point than that of the azeotrope and as illustrated herein, it is preferably preheated prior to contact with the third stage vaporizer composition. Any other means, however, of heating the total mixture in the vaporizer can be employed as well as other means of contacting the azeotrope impuriites with the flux medium.

While certain preferred solvent compositions and flux media, as well as temperatures and pressures, have been cited in the specification herein, the step-wise technique for recovery of substantially pure solvents can be varied without departing from the intended scope of this invention.

What is claimed is:

1. In a process for recovering a solvent employed in a deashing operation to extract catalyst and low molecular weight polymeric residues from an alpha-olefin polymer comprising concentrating the mixture in said solvent contaminated with said residues in a first-stage vaporization zone, concentrating the residue from said first-stage vaporization zone in a second-stage vaporization zone, recycling a portion of the residue from said second-stage vaporization zone through a reboiler and back to the second-stage vaporization zone, passing the remainder portion of said residue from the second-stage vaporization zone to a third-stage vaporization zone, introducing a heated flux medium into the lower section of said third-stage vaporization zone and vaporizing the remainder of said solvent in the residue from said second-stage vaporization zone in conjunction with said heated flux medium, said flux medium being heated to a temperature of about 300° F. and having an initial boiling point above 300° F., and recovering overhead solvent from said first, second and third stage vaporization zones, the improvement in said process which comprises:

(a) using as the solvent in said process a hydrocarbon-alcohol azeotrope having a boiling point between about 150° to 300° F., (b) condensing the effluent recovered overhead from the third-stage vaporization zone, said effluent comprising 50 to substantially 100% of the solvent from said second-stage vaporization residue, (c) refluxing a first portion of said effluent to said third-stage vaporization zone, (d) recycling a second portion of said effluent to said first-stage vaporization zone, (e) passing a third portion of said effluent through an adsorbent bed and (f) recovering a substantially purified solvent from said adsorbent bed.

2. The process of claim 1 wherein the flux medium is heated to a temperature between 300° to 600° F. prior to introduction to the third-stage vaporization zone.

3. The process of claim 1 wherein the contaminated hydrocarbon-alcohol solvent introduced to the first-stage vaporization zone contains less than 5% impurities by weight.

4. The process of claim 1 wherein the polymeric residues are atactic fractions derived from a polypropylene deashing operation.

5. The process of claim 1 wherein the azeotrope is isopropanol-heptane.

References Cited

UNITED STATES PATENTS

| | | | |
|---|---|---|---|
| 2,500,596 | 3/1950 | Adelson et al. | 203—68 X |
| 2,570,066 | 10/1951 | Morrow et al. | 203—69 |
| 2,681,882 | 6/1954 | Grekel | 203—69 X |
| 2,695,867 | 11/1954 | Chambers | 203—69 X |
| 2,962,488 | 11/1960 | Horne | 260—94.7 |
| 3,190,868 | 6/1965 | Mitacek et al. | 159—47 |
| 3,298,932 | 1/1967 | Bauer | 203—100 X |
| 3,311,545 | 3/1967 | Rasmussen | 203—41 |

NORMAN YUDKOFF, *Primary Examiner.*

F. E. DRUMMOND, *Assistant Examiner.*